Sept. 22, 1970     S. A. CUMMINS     3,529,628
VARIABLE FLUID RESTRICTOR
Filed May 10, 1968     4 Sheets-Sheet 1
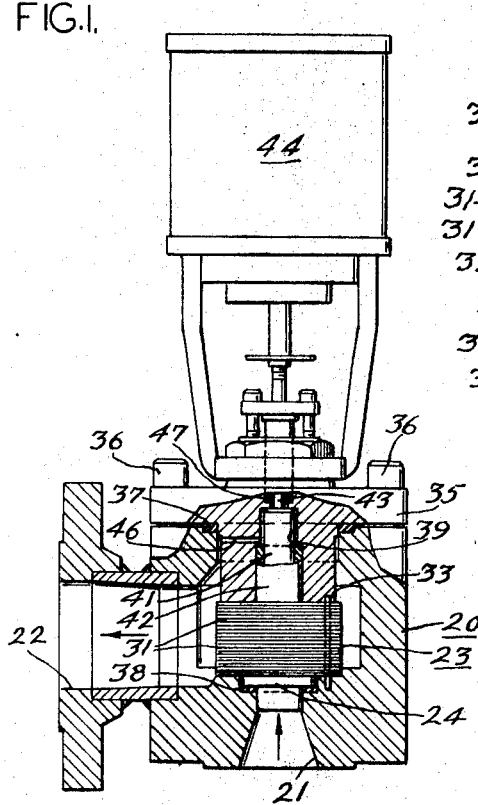
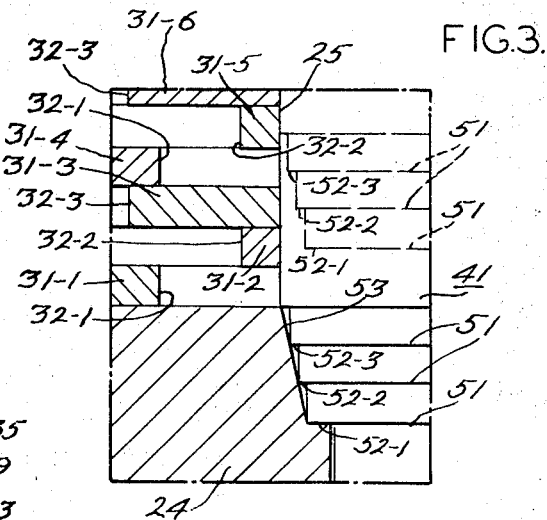
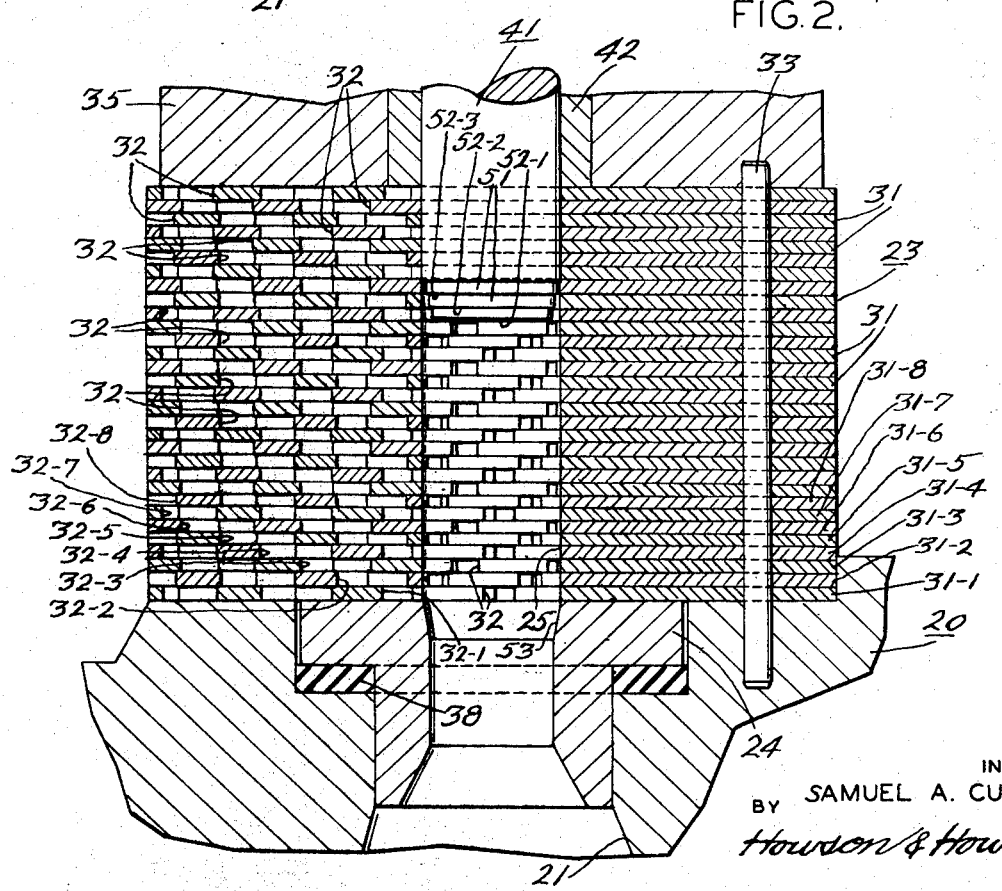
INVENTOR:
SAMUEL A. CUMMINS
BY Howson & Howson
ATTYS.

Sept. 22, 1970         S. A. CUMMINS         3,529,628
VARIABLE FLUID RESTRICTOR
Filed May 10, 1968                    4 Sheets-Sheet 2
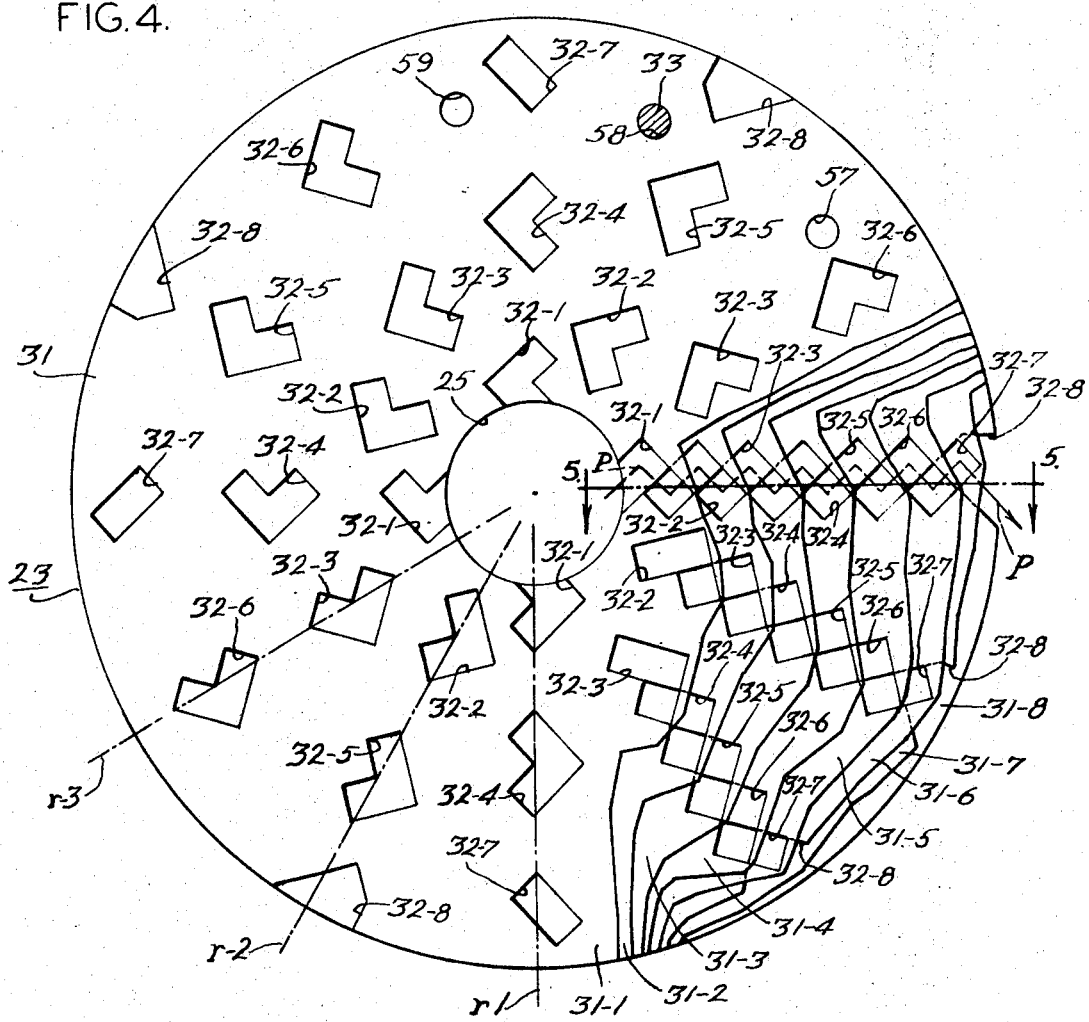
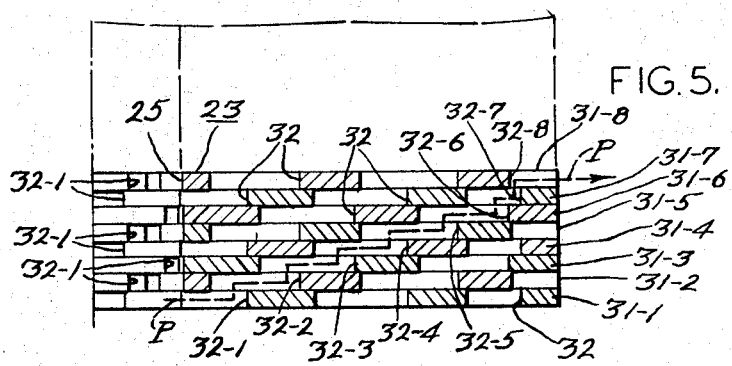
INVENTOR:
SAMUEL A. CUMMINS
BY Howson & Howson
ATTYS.

Sept. 22, 1970          S. A. CUMMINS          3,529,628
VARIABLE FLUID RESTRICTOR
Filed May 10, 1968                    4 Sheets-Sheet 3

INVENTOR:
SAMUEL A. CUMMINS
BY
Howson & Howson
ATTYS

United States Patent Office 3,529,628
Patented Sept. 22, 1970

3,529,628
VARIABLE FLUID RESTRICTOR
Samuel A. Cummins, 235 Colket Lane,
Wayne, Pa. 19087
Filed May 10, 1968, Ser. No. 728,229
Int. Cl. F16k 47/04
U.S. Cl. 137—625.3                                        15 Claims

ABSTRACT OF THE DISCLOSURE

A variable fluid restrictor for reducing the pressure of a flowing fluid comprising a stack of superposed annular plates forming a central bore open to an inlet for the fluid. The perimeter of the stack communicates with an outlet for the fluid. The plates each have a series of openings therethrough that partially overlap similar openings in a plate above and below forming flow passages through the stack in a generally diagonal direction axially and radially therethrough. The flow passages provided by the openings in the plates throttle the fluid flow, reducing the pressure by confining the flow to a path which includes a large number of angular turns arranged in series. The flow paths provided by the openings may be of substantially constant cross section, or may be of gradually enlarging cross section, as desired. The amount of pressure loss provided by the device is adjusted by controlling the number of flow paths exposed to the inlet through the medium of a plug axially displaceable in the central bore.

---

The present invention relates to fluid restrictors for reducing the pressure of a flowing fluid, and has particular application to a device for reducing pressure by producing turbulent friction within a fluid stream by forming tortuous flow passages for the fluid.

The present invention operates to convert pressure energy of a fluid into internal energy or heat as the fluid flows through a series of small tortuous flow passages, resulting in an adiabatic flow. This is opposed to the type of pressure reducer wherein the pressure is reduced by isentropic and orifice-type acceleration and deceleration found in conventional pressure reducing valves.

Prior to the present invention, adiabatic pressure reduction has been accomplished by utilizing a porous filter element in the fluid stream and the pressure loss is adjustable by increasing or decreasing the flow area into the porous element. In such devices, the overall flow path through the porous element is not controlled and furthermore the major portion of the pressure drop occurs at the inlet end of the filter element, leading to rapid wear at this point. In addition, when restricting flow of a compressible fluid, the reduction in pressure upon the fluid generates an increased volume of fluid. Since there is no control of the flow passages, a constant cross sectional flow passage produces a substantially higher exit velocity than inlet velocity, leading to an increase in noise level where it is least desirable. When dealing with contaminated fluids, particularly steam, the porous filter element filters the contaminants from the fluid flow and rapidly becomes clogged, requiring frequent replacement. Since solid-cast or sintered filter elements cannot be disassembled and cleaned readily, they are normally discarded, leading to high maintenance cost.

To eliminate the disadvantages of the porous element, it has been proposed to fabricate the energy absorbing device in the form of a series of washers stacked around a piston-type plug. Each washer is provided with a series of milled-in zigzag paths through which the fluid flows radially. Such paths cannot be readily formed with an increase in cross section and thus there is no compensation for expansion of compressible fluids as the pressure is reduced. Thus, the fluid is discharged from the stack of washers at maximum velocity, generating noise at this point and the pressure reduction is not uniformly distributed throughout the energy absorbing element.

The manufacturing conditions of such washers limit the amount of restriction which can be produced by a given path and in many instances, the diameters of the washers must be substantially increased in order to obtain the desired pressure drop thereacross. Particularly for high pressure installations, an increase in the diameter of the device disproportionately increases the cost. For example, it is a generally accepted rule of thumb that the weight of a valve increases in proportion to the square of the diameter. In this type of valve, as well, the major portion of the pressure drop occurs across the leading edge of the plugs, leading to rapid wear at this location.

With the foregoing in mind, the present invention provides a fluid restrictor of improved construction which is highly economical to manufacture and yet which is fully effective in operation and is economical to maintain.

Another object of the invention is to provide a fluid restrictor having an improved energy absorbing device with a plurality of restricted flow passages therethrough in which the flow passages are accurately controlled in accordance with the characteristics of the fluid flowing therethrough.

A further object of the present invention is to provide a novel annular energy absorbing device for a plug-type variable restrictor, having restricted flow passages therein extending both radially and axially therethrough to provide an increased length of flow paths without substantially increasing the diameter of the device.

A still further object of the present invention is to provide a fluid restrictor which is readily dismantled and cleaned of contaminants.

Yet another object of the present invention is to provide a novel plug-type fluid restrictor having an improved plug conformation allowing a gradual pressure transition in advance of the energy absorbing device.

Still another object of the present invention is to provide an improved two-stage fluid restrictor which affords a greater ratio between the inlet and outlet flow areas thereof.

More specifically, the present invention provides a fluid restrictor embodying an energy absorbing device in the form of a stack of annular plates having a series of holes therethrough, the adjacent plates of the series being mounted with their holes overlapping to define a flow passage which extends radially and axially of said stack, each passage formed by the series of holes providing a tortuous path having a series of angular turns therein. The size and configuration of the holes are selected to provide a desired cross section area of the flow passage. In one embodiment, the area increases progressively therein, so that when handling compressible fluids, the cross section area of the flow passage may be increased with decreasing pressure.

All of the objects of the present invention are more fully set forth hereinafter with reference to the accompanying drawings, wherein:

FIG. 1 is a view of a device made in accordance with the present invention showing the restrictor portion in section;

FIG. 2 is an enlarged sectional view through the stack of annular plates with the plug retracted;

FIG. 3 is a further enlarged sectional view showing in full lines the plug in its cutoff position, and in broken lines the plug partially retracted;

FIG. 4 is an inverted plan view of the stack of throttling plates with the plates broken away successively to illustrate the flow passages therethrough;

FIG. 5 is a fragmentary sectional view taken in line 5—5 of FIG. 4;

Figure 6:
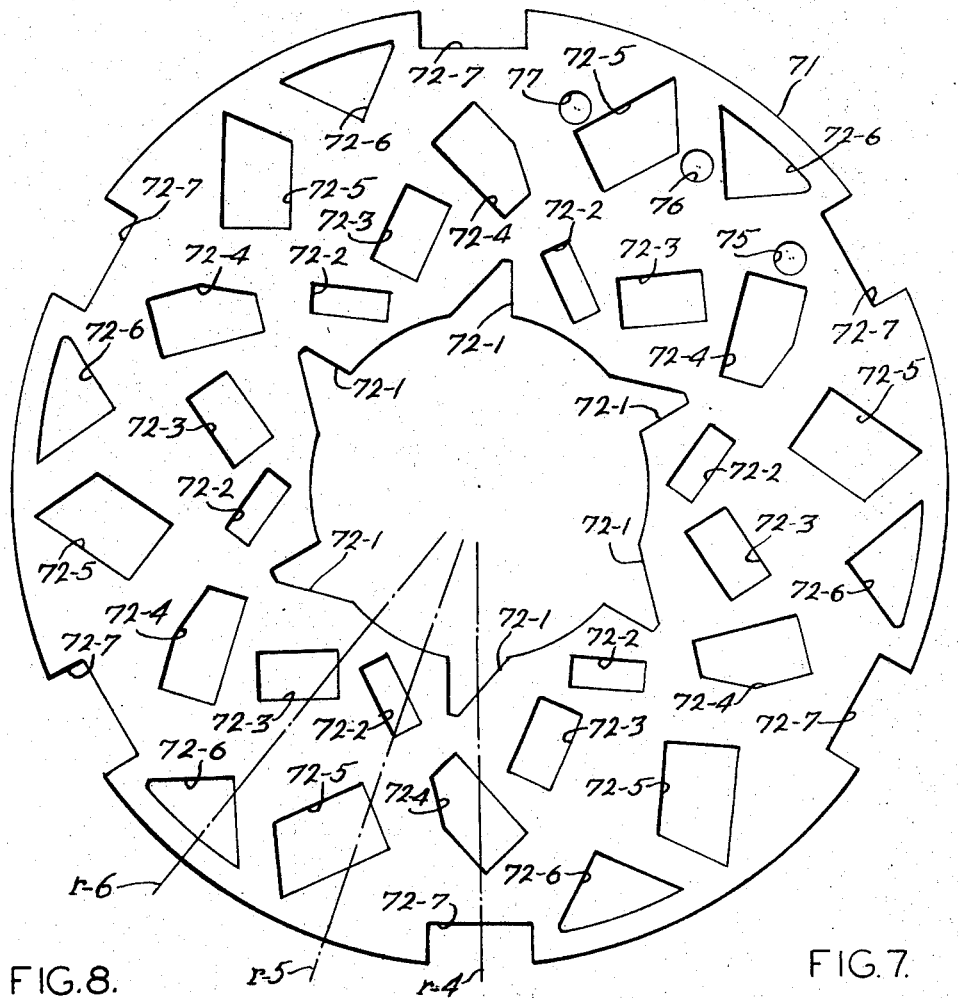
FIG. 6 is a plan view of another embodiment of throttling plate.

The device illustrated in FIGS. 1–5 inclusive comprises a housing 20 having an inlet 21 and an outlet 22. The fluid entering the inlet 21 flows generally radially through an annular energy-absorbing device 23 having a bore 25 and is discharged through the outlet 22. A valve seat 24 is provided in the inlet 21 in registry with the bore 25 of the energy absorbing device 23. The energy absorbing device 23 comprises a stack of annular plates 31 having openings 32 therein which overlap to form flow passages extending outwardly from the bore 25 to the outlet 22 in a generally diagonal direction extending axially and radially of the device 23. The flow passages are spaced circumferentially about the stack of plates 23, in the present instance there being four passages starting in each plate 31. The plates 31 are retained against circumferential displacement by a positioning pin 33 extending through the series of plates 31 forming the energy-absorbing device 23 and are confined against axial displacement by a cap 35 anchored to the housing 20, for example by fasteners 36. The cap 35 has a bore 39 in registry with the bore 25 of the device 23. A seal is provided at 37 between the cap 35 and the housing 20 and a seal is provided at 38 between the valve seat 24 and the housing 20. The device 23 is confined between the cap 35 and the valve seat 24 to route the fluid flow through the flow passages formed by the openings 32.

In order to vary the pressure loss produced by the fluid restrictor of the present invention, a plug 41 is mounted for axial displacement within the bore 25 of the energy-absorbing device 23 and the bore 39 of the cap. As shown in FIGS. 1 and 2, the plug is displaceable axially through the bore 25 and is guided in the cap 35 by a bushing 42 mounted in the bore 39 of the cap. The plunger 41 is actuated by a stem 43 (FIG. 1) projecting upwardly through the cap to a conventional actuator device 44 mounted on the cap 35 in the usual manner. Exhaust pressure from the outlet 22 is introduced into the bore 39 above the piston 41 by a transverse passageway 46 affording fluid flow between the outlet 22 and the bore 39 above the bushing 42. Packing is provided at 47 to exclude leakage around the stem 43.

The plug 41 is displaceable between a fully retracted position shown in FIGS. 1 and 2 and a fully extended position shown in FIG. 3, wherein the leading end of the plug cooperates with the seat 24 to arrest flow through the restrictor. To insure a good seat between the leading end of the plug 41 and the valve seat 24, the end of the plug is stepped inwardly with a series of steps 51 forming a corresponding series of shoulders 51–1, 52–2 and 52–3 which define a taper corresponding to the taper of the seating surface 53 of the valve seat 24. The series of shoulders 52 therefore cooperate with the surface 53 to provide a tight closing action when the plug 41 is in its extended limit position.

As the plug 41 is retracted from the position shown in full lines in FIG. 3, the displacement of the plug exposes successively the flow passages open to the bore 25 of the stack of plates starting with the passages in the lowermost plate 31, designated 31–1 in FIGS. 2 and 3. As the plug is retracted, more plates 31 are exposed, thereby increasing the flow area through the stack and reducing the pressure drop across the stack or energy-absorbing device.

The stepped configuration of the leading end of the plug 41 performs another function in the operation of the fluid restrictor. Inasmuch as the top of the plug 41 is exposed to the outlet pressure of the restrictor, by reason of the passageway 46, the opposite ends of the plug are subjected to the same pressure differential that exists across the energy-absorbing device. This condition may lead to rapid wear of the leading end of the plug and the entryways to the flow passages through the plates. To reduce the pressure differential, the stepped configuration of the leading end performs a pre-throttling process. As shown in the dotted line position of FIG. 3, the fluid passing through the bore 25 must flow past the series of shoulders 52–1, 52–2 and 52–3. The bending of the fluid around these shoulders creates an energy loss in the flowing fluid and thus a pressure drop between the center of the plug 41 and its outer perimeter. Furthermore, the fluid entering the uppermost exposed passageway through the stack 23 is subject to a decreasing flow area by reason of the steps 51 being positioned successively closer to the periphery of the bore 25. Because of the pressure drop across the stepped surface, the pressure drop between the ends of the plug about its periphery is less than the pressure drop through the restrictor.

The plates 31 in the stack 23 provide restricted tortuous flow passages in a generally radial direction from the bore 25 of the stack to its outer periphery. In the embodiment of the invention shown in FIGS. 1 to 5 inclusive, the flow path through the stack is of substantially uniform cross section throughout, but is provided with a multitude of right-angle turns. This is accomplished by making each of the plates 31 identical, with the openings 32 disposed in a pre-selected pattern. As shown in FIG. 4, each quadrant of the plate is similar, having eight openings therethrough, identified by the reference numerals 32–1 to 32–8, successively, in accordance with the distance from the center of the plate. As shown, the openings 32–1, 32–4, and 32–7 are located on one radius, for example, radius $r$–1 at 6 o'clock in FIG. 4; the openings 32–2, 32–5, 32–8, are located on a radius spaced 30° from the first radius, for example radius $r$–2 at 7 o'clock in FIG. 4; and the openings 32–3 and 32–6 are located on a third radius spaced 30° from the previous radius, for example radius $r$–3 at 8 o'clock in FIG. 4. In this way, the openings 32 are separate and distinct from each other within each plate.

When the plates are assembled into the stack, they are offset circumferentially 30° successively. With reference to FIG. 4, which is an inverted plan, the bottom plate 31–1 is positioned for example with its radius $r$–1 at 6 o'clock. The plate 31–2 is offset circumferentially counterclockwise 30° so that its radius $r$–2 is at 6 o'clock. Likewise the plate 31–3 is offset circumferentially counterclockwise 30° from the plate 31–2 so that its radius $r$–3 is also at 6 o'clock. In this manner the opening 32–1 of the plate 31–1 partially underlies the opening 32–2 of the plate 31–2. In like manner the opening 32–2 in the plate 31–2 partially underlies the opening 32–3 in the plate 31–3 and so forth as clearly shown in FIG. 5. In this manner the flow of fluid is in a path P generally diagonally upward and outward from the bore 25 to the outer periphery of the stack. The configuration of the openings 32 is such that in the vertical or axial plane shown in FIG. 5 each opening overlaps only the openings in the adjacent plates but does not overlap the openings in the next-adjacent plates so that the fluid must make two right angle turns when passing from the opening 32–1 to the opening 32–2, the very first turn being from a horizontal or radial direction to a vertical or axial direction and the second turn being in a vertical or axial direction to a horizontal or radial direction. This double turning is repeated between each pair of plates so that in the vertical plane of FIG. 5, the fluid must make 14 right angle turns in the vertical plane traveling from the bore 25 to the outer periphery.

In addition to the turns in the vertical plane, the fluid must also make a series of turns in the horizontal or radial plane. It is noted that each of the openings 32, except the openings 32–7 and 32–8 is angular in form with two legs disposed at approximately 45° to the radius $r$–1, $r$–2, or $r$–3. A horizontal or facial projection of the flow path P through the openings 32 is shown at $t$ at 3 o'clock in FIG. 4. As shown, the fluid must therefore make 13 right angle turns in a horizontal or radial plane in traveling from the bore 25 to the outer periphery of the stack. Thus, the intricate tortuous flow path provided through the openings 32 in the stack produces 27 sharp 90° turns. Since each 90° turn produces a head loss coefficient in the flowing fluid ($k$) of 1.2, the total head loss coefficient ($k$) is 32.4. The total pressure loss through a single path is then 32.4 $v.^2/2g$. This loss must be added to the frictional loss resulting from the strict linear flow of the fluid through an elongated path of restricted cross section. The fact that the path is a zigzag path and is disposed diagonally through the stack provides an extended lineal throttling of the fluid which further increases the head loss which would occur through a straight horizontal or radial flow along a radius.

In order to determine the proper position of the plates, each plate is provided with three positioning holes, 57, 58 and 59 spaced apart 30° as shown in FIG. 4. The plates are angularly positioned by the positioning pin 33 which extends between the housing 20 and the cap 35, as shown in FIG. 2.

With reference to FIGS. 4 and 5, it is apparent that the path is of substantially uniform cross section throughout its travel from the bore to the outer periphery of the stack. By reason of the arrangement of the openings in quadrants, there are four pathes initiated in the plate 31–1 at 90° intervals about the circumference of the plate. In the plate 32–2, four additional paths are initiated at 90° intervals which are offset 30° from the paths initiated in plate 31–1. Thus as the plug 41 is withdrawn the flow area through the stack increases in direct proportion to the linear displacement of the plug. This relationship can be altered by placing unequally perforated plates on top of each other or by altering the thickness of the plates progressively through the stack.

When handling compressible fluids, it is desirable to provide increasing cross section in the flow paths progressively outward through the stack. In such a case, a plate such as shown in FIG. 6 may be substituted for the plates shown in FIG. 4. As shown in FIG. 6, the plate 71 includes a series of openings 72 grouped in sextants of the plate. In this way, each plate provides the initiation of six flow paths. In each sextant, there are seven openings designated 72–1 through 72–7, the openings 72–1 intersecting the inner periphery of the annular plate 71 and the openings 72–7 intersecting the outer periphery of the plate. Referring to the lower left sextant of the plate shown in FIG. 6, the openings 72–1, 72–4 and 72–7 are disposed along a radius $r$–4; the opening 72–2 and 72–5 are disposed on a radius $r$–6. The radii $r$–4, $r$–5 and $r$–6 are offset circumferentially 20° and positioning holes 75, 76 and 77 are provided at 20° spacings in the upper righthand sextant of each plate. The radial distance of the holes 75, 76 and 77 from the center of the plate is equal to the radial distance of the holes 57, 58 and 59 in the plates 31 so that the plates 71 may accommodate a pin similar to the pin 33. Inasmuch as the inner diameter of the plates 71 is is greater than the inner diameter of the plates 31, a larger plug than the plug 41 must be used.

Figure 8:
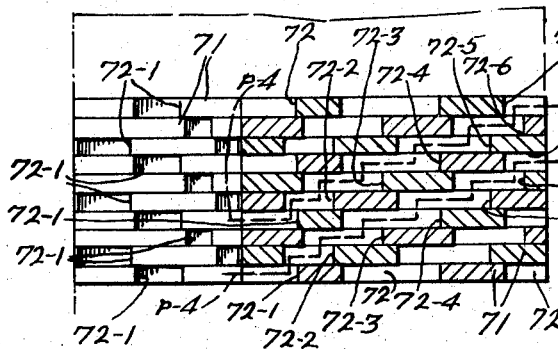
FIG. 8 is a fragmentary sectional view taken on the irregular section line 8—8 of FIG. 7.
Figure 7:
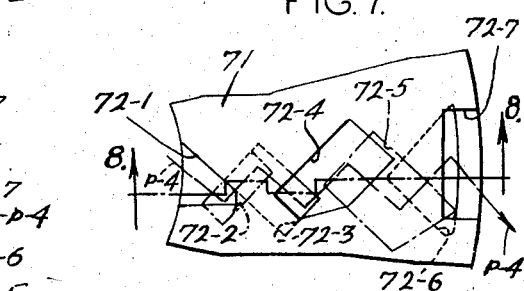
FIG. 7 is a fragmentary plan view of a stack of plates shown in FIG. 6 and illustrating in dotted and dot-and-dash lines the first and second underlying plates so as to show the overlapping openings which provide the desired flow passage therethrough.

As with the previously described embodiment, the plates are stacked in successively offset relation so that the openings 72–1 through 72–7 successively partially overlap to provide a tortuous flow path $p$–4, extending diagonally in a generally radial direction outwardly and upwardly through a stack. As shown in FIGS. 7 and 8, the path $p$–4 effects a multitude of right angle turns, in the present instance, twelve in the vertical plane and six in the horizontal plane, totaling eighteen. Thus the path $p$–4 provides a head loss in the same manner as the path $p$ of the previously described embodiment.

Figure 9:
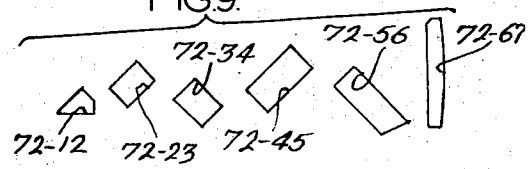
FIG. 9 is a detached view of the series of ports formed by the overlapping openings in FIGS. 7 and 8.

The particular form of the openings 72–1 through 72–7 and their arrangement of partial overlaps provides a gradually increasing cross sectional area to the flow path. The overlap of the openings in successive plates provide a port through which the flow occurs and FIG. 9 illustrates these ports. In this figure the port between the openings 72–1 and 72–2 has been designated 72–12. The next port, between the openings 72–2 and 72–3, has been designated 72–23. The next ports have been designated 72–34, 72–45, 72–56 and 72–67. Thus, it is apparent that the ports provide increasing flow area in the paths as the fluid progresses from the inner periphery to the outer periphery of the stack of plates. In other respects, the plates 71 operate in a manner similar to the plates 31 to provide the desired pressure reduction in the fluid flowing through the paths $p$–4.

As each plate is exposed during retraction of the plug, six additional flow passages $p$–4 are exposed until the plug reaches its upper limit. For production economy, it is desirable to have all of the plates formed identically, but it may be preferred for special installations to modify the shape and/or arrangement of the opening progressively in the stack, particularly when the pressure loss across the stack varies between wide limits.

A reduction of pressure in a flowing gas is normally accompanied by an increase in the lineal velocity of the gas. Thus, when expanding high pressure gas into atmosphere, care must be taken to keep the velocity of the escaping gas below sound of velocity to thereby avoid excessive noise. To accomplish this, the flow area of the path at its point of escape to atmosphere must be sufficiently large to provide the desired reduction in velocity. In installations where there is a 10:1 pressure ratio between inlet and outlet, it is substantially impossible to obtain a ten-fold increase in flow area in a single stack of plates. In order to obtain the desired increase in flow area, two stacks of plates may be employed in a single pressure reducing device.

Figure 10:
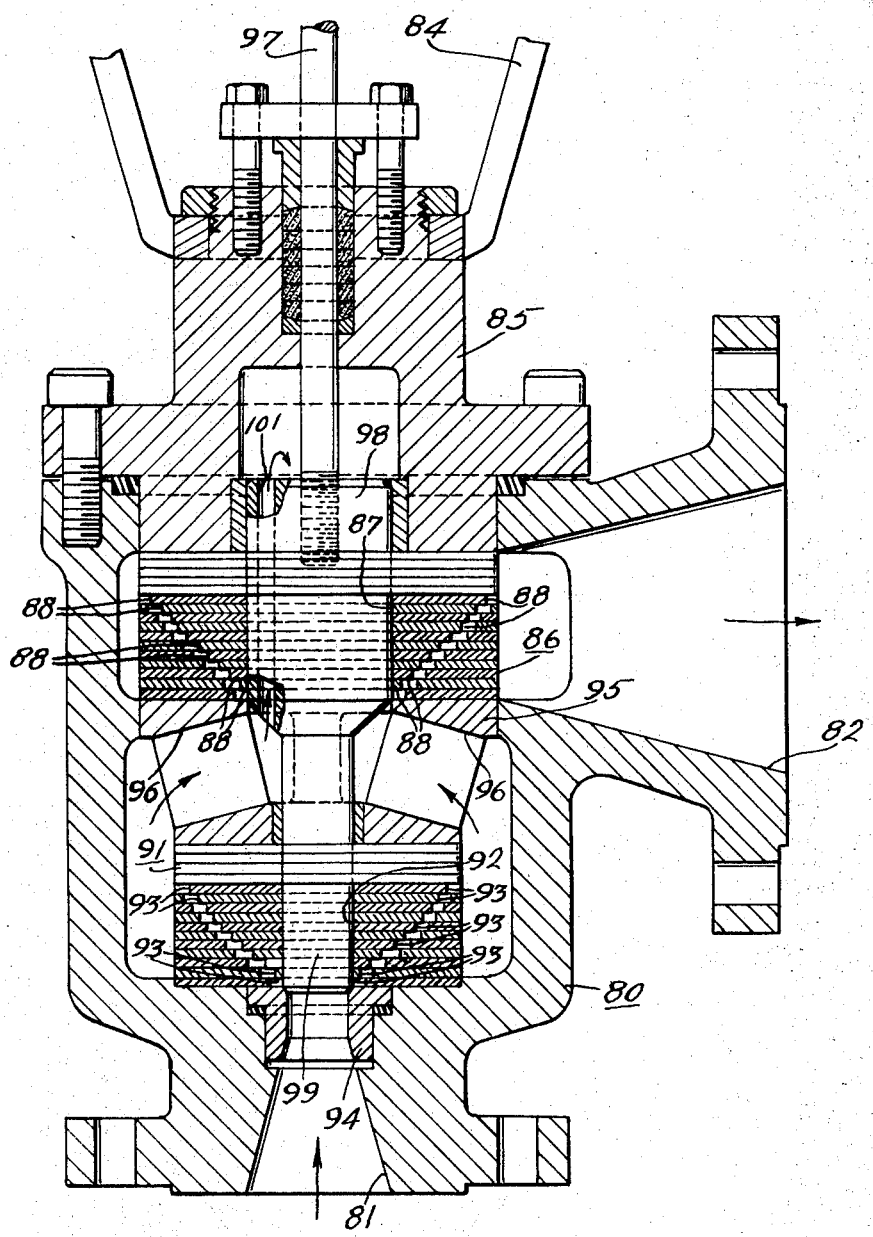
FIG. 10 is an enlarged sectional view through a modified embodiment of a fluid restrictor made in accordance with the present invention.

FIG. 10 illustrates a device of this character wherein two stacks of plates are disposed in series. In this embodiment of the invention, a housing 80 having an inlet 81 and outlet 82 is closed by a cap 85 which mounts a conventional pressure actuator structure 84. The cap 85 confines an upper stack 86 of throttling plates having a large bore 87 and openings 88 forming flow passages therethrough; a lower stack 91 of throttling plates having a reduced diameter bore 92 and openings 93 providing flow passages therethrough. The bore 92 is in registry with an inlet valve seat 94 positioned in the inlet 81. Communication from the outer periphery of the stack 91 to the bore 87 is provided through a spacer structure 95 providing a flow passage 96 therethrough. The actuator structure 84 includes a stem 97 depending downwardly therefrom and mounting a two-stage plug having an upper section 98 slidable in the bore 87 and a lower section 99 slidable in the bore 92. An axial passageway 101 through the section 98 is provided to equalize the pressure at the opposite ends of the upper section 98.

In this embodiment of the invention, the smaller set of plates may have an area ratio of, for example, 5:1 absorbing the pressure drop, for example, from 500 to 100 p.s.i. absolute the larger set of plates may have an area ratio of 7:1 reducing the pressure finally from 100 p.s.i. absolute to atmosphere, thus enabling a total ratio of 35:1.

Thus the present invention provides a pressure reducer which is effective to produce the desired pressure drop in a flowing fluid in a minimum of space. The use of stacked plates provides an assembly which may be readily dismounted to afford cleaning of the individual plates in the event there is an accumulation of foreign matter in the flowing fluid which might become deposited in the flow passages and thereby might adversely affect the operation of the pressure reducer. The construction and arrangement of the plates enable an increase in cross sectional flow area in the flow passages through the energy absorbing device in an efficient and effective manner.

While particular embodiments of the present invention have been herein illustrated and described, it is not intended to limit the invention to such disclosures but changes and modifications may be made therein and thereto within the scope of the following claims.

What is claimed is:

1. In a variable fluid restrictor comprising a housing having an inlet port and an outlet port for fluid flowing therethrough, an annular energy-absorbing device having a bore open to one of said ports and an outer periphery open to the other of said ports, a plug slidable axially in said bore, and an actuator connected to said plug to displace the same within the said bore to vary the surface of said bore exposed to said one port and thereby to vary the resistance to fluid flow imparted by said energy-absorbing device and to regulate the pressure loss therethrough; the improvement wherein said energy absorbing device comprises a stack of annular plate members, each plate member having a central bore adapted to be mounted coaxial with other plate members to form the bore of said energy-absorbing device, each plate member having a series of separate openings therein disposed in a preselected arrangement at progressively greater radial distances from the center of said plates, the first opening of said series intersecting the bore of its plate to provide fluid communication with said bore and said one port, and the final opening in said series intersecting the outer periphery of its plate to provide fluid communication with said other port, the openings of each plate partially overlapping openings in adjoining plates to provide a tortuous flow path for the fluid through the openings in successive plates between the bore and the outer periphery of said stack, said tortuous paths providing a multitude of angular turns as the fluid passes from an opening in one plate to the opening in the adjoining plate at the point of overlap in a vertical plane.

2. A variable restrictor according to claim 1 wherein each opening in the series in the intermediate plates of said stack partially overlaps the preceding opening in the series in the preceding plate and the succeeding opening in the series in the succeeding plate to thereby provide a flow path extending in a generally diagonal direction radially and axially of said stack.

3. A variable restrictor according to claim 2 wherein the configuration and arrangement of openings is such that each opening overlaps the opening in the adjacent plate but does not overlap the opening in the next-adjacent plate, so that the fluid flowing therethrough must make two right-angle turns in the axial plane in flowing from one plate to the next.

4. A variable restrictor according to claim 1 wherein said partial overlap of said openings provide a series of ports intermediate the openings in adjacent plates, said series of ports having flow areas successively increasing in the direction of flow of fluid therethrough.

5. A variable restrictor according to claim 1 wherein the openings provide a flow path having a zigzag configuration in facial projection.

6. A restrictor according to claim 5 wherein the openings intermediate said first and final openings of the series are angular having two legs disposed at respectively opposite 45° angles to a radius to thereby effect a right angle turn of the fluid in the radial plane.

7. A restrictor according to claim 1 wherein said plates of the stack are identical in form, the successive openings in said series being offset circumferentially in each plate, said identical plates being mounted in said stack in circumferentially offset relation corresponding to the offset of said openings.

8. A restrictor according to claim 7 wherein said identical plates have a series of positioning holes offset circumferentially corresponding to the offset of said openings, said restrictor including a positioning pin engaging in selected holes to retain said plates in their properly offset relationship.

9. A restrictor according to claim 1 wherein said energy-absorbing device comprises a second stack of annular plate members having a central bore aligned with the bore of the first stack, said plug having a separate section in each bore so that axial displacement varies the exposed surfaces of the two bores simultaneously, and means directing fluid in series through said first and second stacks.

10. A restrictor according to claim 9 wherein said second stack provides a greater flow passage area than the first stack, permitting expansion of said fluid in its flow through said restrictor.

11. A restrictor according to claim 10 wherein each stack provides increasing flow area therethrough, the overall flow area ratio being the product of the individual flow area ratios.

12. A restrictor according to claim 1 wherein said plug at its leading end has a series of steps providing shoulders projecting into the flow path in said bore whereby the fluid flowing in said flow path creates a pressure differential across leading end of said plug.

13. A restrictor according to claim 12 wherein said bore communicates with the inlet port of said housing, including a tapered valve seat in said inlet port coaxial with said bore, the shoulders on said plug defining a taper complementary to said valve seat and engageable therewith to arrest flow through said restrictor.

14. In a variable fluid restrictor comprising a housing having an inlet port and an outlet port for fluid flowing therethrough, an annular energy-absorbing device having a bore providing a flow path open to one of said ports, an outer periphery open to the other of said ports, and a plurality of flow passages between said bore and said periphery having open ends spaced along a length of the surface of said bore, a plug slidable axially in said bore to expose successively the open ends of said plurality of flow passages, and an actuator connected to said plug to displace the same within the bore to vary the number of open ends in the surface of said bore exposed to said one port and thereby to very the resistance to fluid flow imparted by said energy-absorbing device and to regulate the pressure loss therethrough; the improvement wherein said plug is displaceable axially within said bore and is provided at its leading end with a series of steps forming shoulders projecting into the flow path in said bore, whereby the fluid flowing in said flow path creates a pressure differential across the leading end of said plug.

15. A variable fluid restrictor according to claim 14 wherein said bore communicates with the inlet port of said housing, including a tapered valve seat in said inlet port coaxial with said bore, the shoulders on said plug defining a taper complementary to said valve seat and engagable therewith upon full advance of said plug to arrest flow through said restrictor.

References Cited

UNITED STATES PATENTS

| | | | |
|---|---|---|---|
| 2,053,611 | 9/1936 | Hill | 137—625.3 X |
| 2,118,295 | 5/1938 | Crawford et al. | 138—46 X |
| 3,219,059 | 11/1965 | Williams et al. | 137—625.3 |

ARNOLD ROSENTHAL, Primary Examiner

U.S. Cl. X.R.

138—43, 46; 251—282